Feb. 7, 1956     A. P. SCHNEIDER     2,733,696
INTERNAL-COMBUSTION ENGINES AND INDUCTION SYSTEMS THEREFOR
Filed Aug. 6, 1951     4 Sheets-Sheet 4
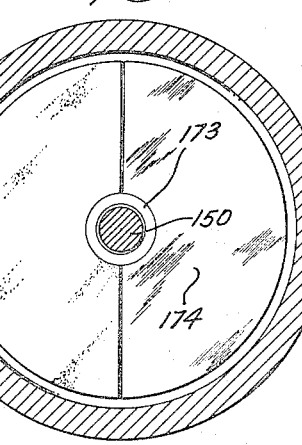
Fig. 13.
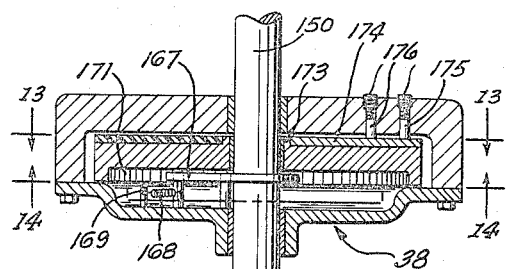
Fig. 12.
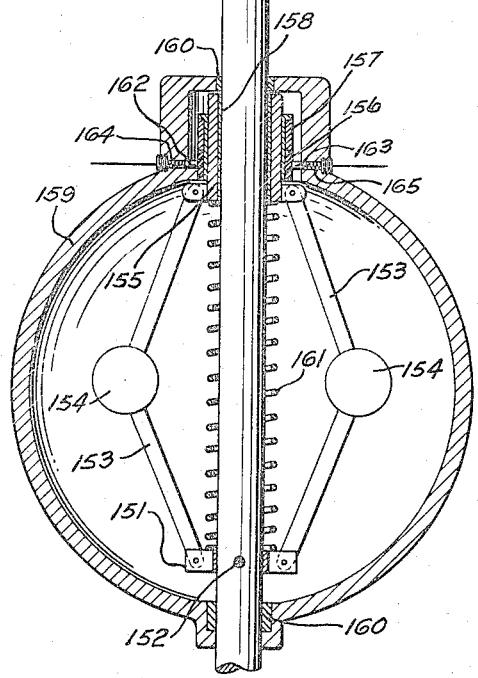
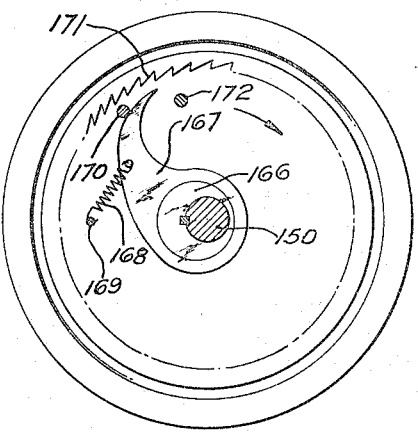
Fig. 14.
INVENTOR.
Albert P. Schneider,
BY Morsell & Morsell
ATTORNEYS

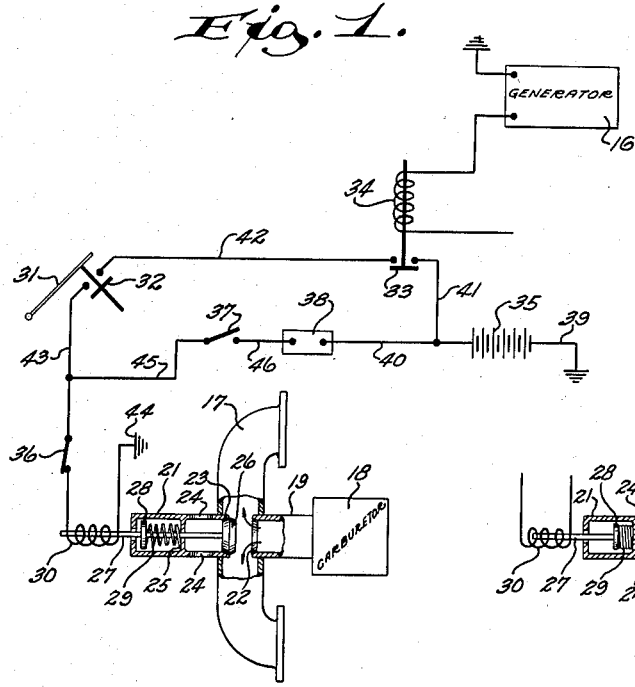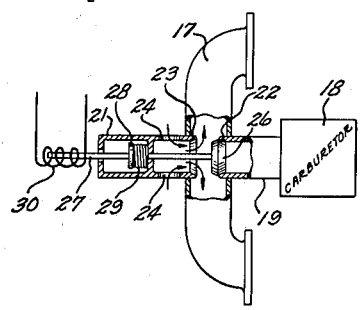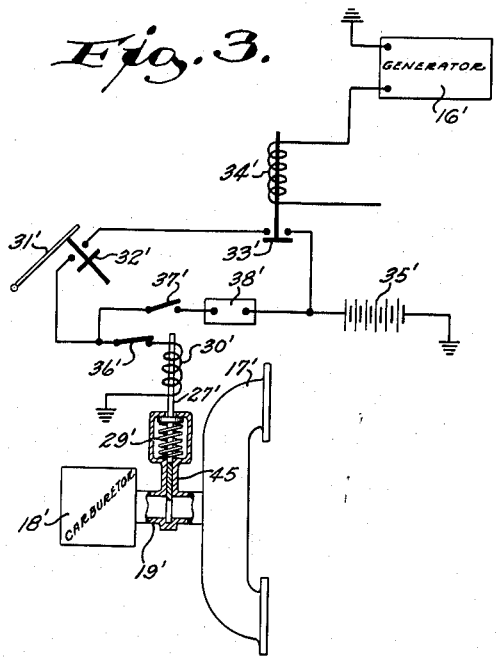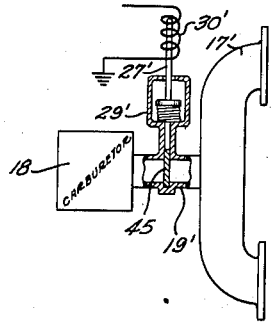

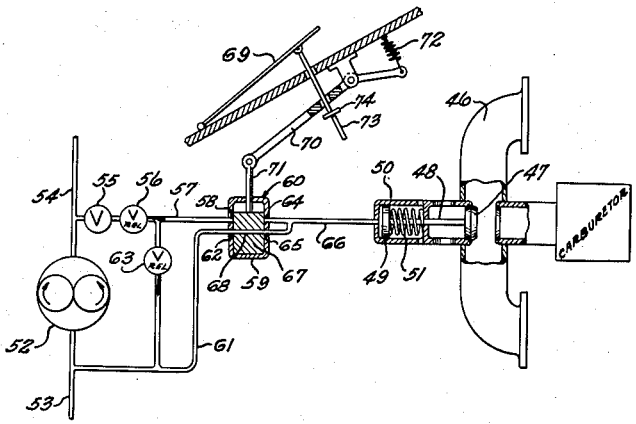
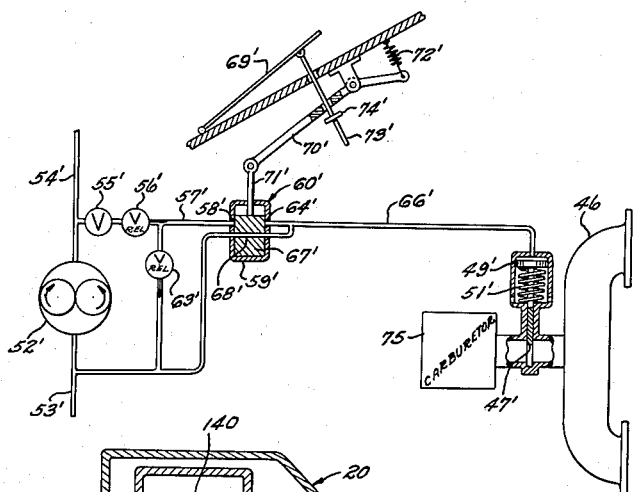
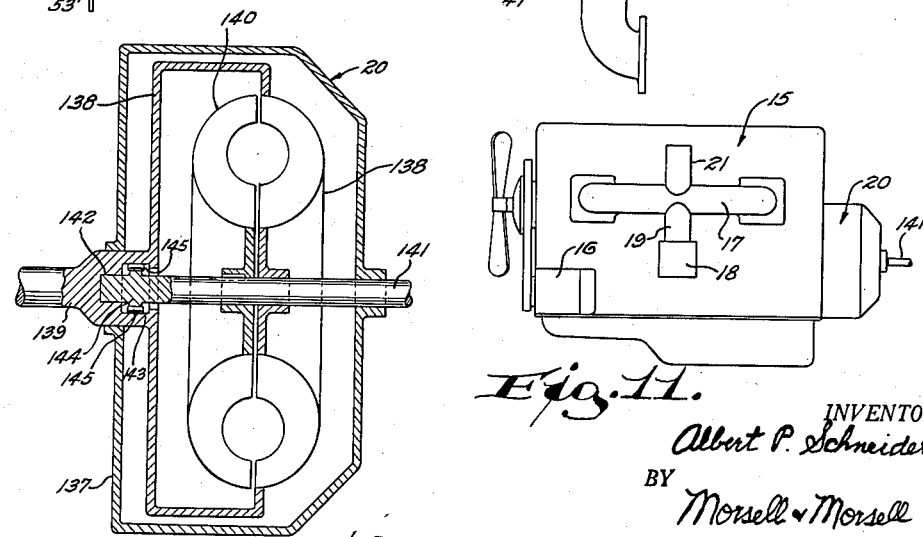

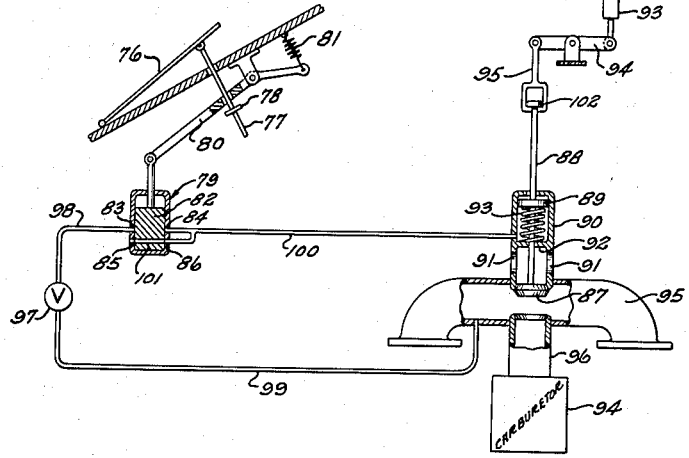

United States Patent Office 2,733,696
Patented Feb. 7, 1956

2,733,696

INTERNAL-COMBUSTION ENGINES AND INDUCTION SYSTEMS THEREFOR

Albert P. Schneider, Milwaukee, Wis.

Application August 6, 1951, Serial No. 243,845

15 Claims. (Cl. 123—97)

This invention relates to improvements in internal combustion engines and induction systems therefor.

Throughout the development of the automobile and the internal combustion engine, engineers have been striving to increase mileage without sacrificing speed, acceleration, or maneuverability and also without impairing the safety of the vehicle. From time to time economy runs have been made, and in these contests remarkable mileage has been attained. However, the mileage attained in an economy run cannot be attained by a vehicle travelling in normal highway traffic.

In an economy run the contestant driver keeps the throttle about half way open at all times, and when the vehicle reaches its highest efficient speed (about 40 miles per hour in most cases), the ignition is shut off and the clutch disengaged. The car is permitted to coast until its speed has diminished to a predetermined lower speed, at which time the ignition is again turned on and the clutch is engaged, thereby starting the engine. The engine is permitted to accelerate to the predetermined most efficient high speed, and the cycle is again repeated. Very favorable mileage is obtained by operating the car in this manner, but it is hard on the mechanism of the car and, more important, is unsuitable for average driving, since it would cause confusion on the road and would therefore be unsafe.

There are a number of reasons contributing to the high mileage attained by the operation of an automobile in the manner described. The maximum efficient speed is not only the most efficient from the standpoint of engine operation, but is also the optimum speed as far as wind resistance to the travel of the automobile is concerned. At low speeds a wasteful rich mixture must be fed to the engine, whereas at speeds higher than the maximum efficient speed pumping losses are excessive, and a full charge cannot be drawn into the cylinders. Here also a richer mixture must be used, thereby wasting gasoline. In addition, at excessively high speeds overcoming the wind resistance requires a major portion of the power output of the engine.

From an efficiency standpoint, a very undesirable situation occurs at any time that the throttle is closed while the automobile is in motion. In such a case fuel continues to be fed to the engine, but, since the carburetor butterfly valve is in idle position the amount of air taken into the cylinder is very small. Very low compression and misfiring results. In addition, the vacuum created in the cylinders causes lubricating oil to be drawn into the combustion chambers, causing carbon deposits and fouling of the spark plugs. At such times, the explosion in the cylinders is so weak that it delivers no power, and the engine actually has a braking effect on the car.

With the above in mind, it is the general object of the present invention to provide an improved induction system which will substantially increase the mileage of a vehicle without impairing the speed, maneuverability, acceleration, or safety of the vehicle.

A further object of the invention is to provide an improved induction system of the class described, the operation of which does not require any change in the driving habits of the driver.

A further object of the invention is to provide an improved induction system of the class described which can be rendered inoperative at the will of the driver to permit operation of the engine in a conventional manner.

A further object of the invention is to provide an induction system of the class described which prevents carbon deposits and fouling of spark plugs, and which also prevents contamination of the lubricating oil.

A further object of the invention is to provide an improved torque transmitting mechanism for use in combination with an engine provided with the improved induction system, the torque transmitting mechanism having embodied therein a one-way clutch for providing a direct driving connection between the driving and driven elements thereof when the driven element tends to drive the driving element.

A further object of the invention is to provide an improved induction system by which the engine is cooled internally, thereby preventing overheating of the engine, particularly when travelling in hilly country where travel in lower gears is required on steep grades.

With the above and other objects in view, the invention consists of the improved induction system and all of its parts and combinations, as set forth in the claims and all equivalents thereof.

In the drawings accompanying and forming a part of this specification, wherein are shown several forms of the invention, and wherein like characters of reference indicate the same parts in all of the views:

Fig. 1 is a diagrammatic view of the preferred form of the invention;

Fig. 2 is a diagrammatic view of a portion of the mechanism shown in Fig. 1, the control valve being shown in an adjusted position;

Fig. 3 is a diagrammatic view of an electrically operated modified form of the invention;

Fig. 4 is a fragmentary diagrammatic view of a portion of the device shown in Fig. 3 with the control valve in closed position;

Fig. 5 is a diagrammatic view of an hydraulic operated modified form of the invention;

Fig. 6 is a diagrammatic view of another hydraulically operated modified form of the invention;

Fig. 7 is a diagrammatic view of a mechanical governor-vacuum operated modification of the invention;

Fig. 8 is a diagrammatic view of another mechanical governor-vacuum operated modification of the invention;

Fig. 9 is a diagrammatic view of a mechanical governor-fluid pressure operated modification of the invention;

Fig. 10 is a semi-diagrammatic axial sectional view of a fluid coupling type of torque transmitting mechanism adapted for use in combination with an engine provided with the improved induction system;

Fig. 11 is a side view of a vehicle engine provided with the improved induction system and with the improved fluid coupling shown in Fig. 10;

Fig. 12 is an enlarged vertical sectional view of the speed responsive timing switch;

Fig. 13 is a transverse sectional view taken on line 13—13 of Fig. 12; and

Fig. 14 is a transverse sectional view taken on the line 14—14 of Fig. 12.

Referring first more particularly to Figs. 1 and 11 of the drawings, the numeral 15 indicates an internal combustion engine of the type ordinarily used in self-propelled vehicles, such as a gasoline engine. The engine 15 is provided with a generator 16 and an intake manifold 17 to which a carburetor 18 is connected through a conduit 19. The engine may also be provided with a torque transmitting mechanism 20, such as the fluid coupling shown more clearly in Fig. 10.

In the preferred embodiment of the invention the intake manifold is provided with valve means for closing off the connection 19 between the carburetor and the intake manifold and for venting the interior of the manifold to the atmosphere. In the form of the invention illustrated in Fig. 1, the manifold 17 is provided with a tubular extension 21 which is preferably coaxial with the conduit 19. One end of the conduit 19 projects internally of the manifold 17 and is formed with an annular valve seat 22. One end of the tubular extension 21 also projects internally of the manifold 17 and is formed with an annular valve seat 23 which is spaced from the valve seat 22. The tubular member 21 is formed with a pair of apertures 24 outwardly of the manifold 17, and outwardly of the apertures 24 the tubular extension 21 is formed with a transverse interior partition 25, which is centrally bored. A poppet valve 26 is formed with an elongated stem 27 and has a pair of annular valve faces which are adapted to seat respectively in the valve seats 22 and 23. The valve stem 27 is formed with a shoulder 28, and positioned around the stem between the shoulder 28 and the partition 25 is a helical compression spring 29. The spring 29 normally maintains the valve 26 seated on the annular valve seat 23 as shown in Fig. 1. The outer end of the valve stem 27 is connected to a solenoid having a coil 30.

The numeral 31 indicates a foot accelerator which is connected through suitable linkage to the carburetor 18 in the usual manner. A normally closed switch 32 is actuated by the accelerator 31, being closed when the accelerator is in raised position, and being open when the accelerator is depressed. A normally open switch 33 is actuated by a solenoid 34. The solenoid coil 34 is connected in series with the generator 16, as shown. The numeral 35 indicates a battery, and the numerals 36 and 37 indicated "on"-"off" switches which are preferably mounted on the dash board of the vehicle. The numeral 38 indicates a timing or speed responsive switch which is preferably of the form shown in Figs. 12–14 inclusive and which will be described more fully hereinafter. Where a timing switch is used, in its operation it is intended to open and close at predetermined intervals. Where a speed responsive switch is used, said switch is connected to the engine in a manner to close when the vehicle speed reaches a predetermined level and to open when the vehicle speed reaches a predetermined lower level.

One terminal of the battery 35 is grounded to the vehicle's frame through a wire 39, and the other terminal of the battery is connected, through wires 40 and 41, to one terminal of the switch 38 and one terminal of the switch 33, as shown. The other terminal of the switch 33 is connected through a wire 42, to one contact of the switch 32. The other contact of the switch 32 is connected, through a wire 43, to the dash board switch 36. The solenoid coil 30 has one end connected to the other terminal of the switch 36 and has its other end grounded to the vehicle frame as indicated at 44. The dash board switch 37 is connected between the other terminal of the timing or speed responsive switch 38 and wire 43 by means of wires 45 and 46.

In the operation of the improved induction system shown in Fig. 1 the switch 33 is normally open, and the solenoid 34 is of such size that it is incapable of closing the switch 33 until the current output of the generator reaches a predetermined level. This output level is preferably reached by the generator at vehicle speeds in excess of from ten to fifteen miles per hour. Therefore, at vehicle speeds above this level the switch 33 is closed, and at speeds below this level said switch is open.

Whenever the accelerator 31 is depressed the vehicle operates in the usual manner, i. e., fuel and air mixture is drawn into the intake manifold 17 from the carburetor 18 through the conduit 19 as indicated by the arrows in Fig. 1. However, whenever the vehicle is traveling in excess of fifteen miles per hour and the accelerator 31 is released, thereby closing the switch 32, electrical current flows from the battery 35 through the wire 41, the closed switch 33, the wire 42, the closed switch 32, and the closed switch 36 into the solenoid coil 30. This energizes the coil 30, and the valve 26, with elongated stem 27 and shoulder 28, are forced inwardly to the position shown in Fig. 2.

In this position the valve 26 is seated on the valve seat 22, and the inner end of the conduit 19 is thereby closed off to prevent communication between the carburetor 18 and the manifold 17. At the same time the inner end of the tubular connection 21 is opened, venting the interior of the manifold 17 to the atmosphere through the apertures 24. Air is thus permitted to enter the manifold 17, as indicated by the arrows in Fig. 2. The unrestricted entry of air into the engine through the apertures 24 permits free breathing of the engine and reduces the braking effect of the engine normally caused by low compression resulting from closing the throttle. Free breathing of the engine also prevents pumping of oil up into the cylinder as a result of high vacuum conditions which exist in conventional engines when traveling at higher speeds with the throttles closed. In addition, the free breathing of outside air and the absence of any fuel prevents any explosion in the engine and has an internal cooling effect upon the engine which is of great value in preventing overheating of the engine, particularly when traveling in the mountains.

When travelling substantial distances in the open country on comparatively level stretches of road, the use of the timing or speed responsive switch 38, shown in Figs. 12–14 inclusive, is particularly economical. The speed sensitive control device is shown in Fig. 12. Shaft 150 is connected to and driven by the engine. A governor anchor 151 is pinned or fastened to the shaft 150 by a pin 152. Conventional governor arms 153 have weights 154 associated therewith to aid in the operation of the governor. The upper ends of the governor arms 153 are pivotally mounted in a suitable extension of the governor top section 155. This governor top section is slidably journaled on the shaft 150. Surrounding the lower part of the sleeve portion of the governor top section 155 is an insulator ring 156. The upper part of the governor top section 155 is sleeved with a ring 157 made of a conducting material. The conducting ring 157 is insulated from its adjoining parts by an insulator sleeve 158. The whole mechanism is enclosed in a Bakelite housing 159. The Bakelite housing has a proper bearing insert in its upper and lower ends, as indicated at 160. A spring 161 tends to hold the governor arms 153 close to the shaft, counteracting the tendency of the whirling governor weights and downward movement of the governor top section 155 to the desired degree. A brush 162 is held in contact with the sleeved governor top section 155 by the spring 164.

A suitable electrical wire connects the brush 162 with the manual switch on the vehicle dash. The switch on the dash (not shown) connects with the source of electrical power such as a battery. A brush 163 is held in contact with the sleeves of the governor top section 155 by a spring 165. A wire conductor connected with the brush 15 conducts the electric current to the timing part of the switch shown in Figs. 12, 13 and 14.

The timing part of the mechanism is operated by shaft 150. On said shaft an eccentric 166 is keyed. Surrounding and journaled on the eccentric 166 is a pawl 167 which is prevented from rotating by a spring 168. Said spring is anchored at one end to the pawl 167 and on the other end to an anchor pin 169. Pawl guide pin 170 causes the extension on pawl 167 to move in a circular motion thereby engaging the teeth of a ratchet wheel 171 and move the ratchet wheel body in a path rotating around the shaft 150. A pawl guide and safety pin 172 prevents damage, should the spring 168 break.

The body of the ratchet wheel 171 is formed with an extension sleeve 173. Surrounding the extension sleeve 173 and fastened to the upper surface of the ratchet body 171 is a plate or commutator frame 174. On the upper surface of commutator frame 174 is a commutator made of one section of insulator material and the other section is made of a material suitable for conducting electric current. Electric current from brush assembly 163 is conducted through an upright brush assembly 175, to the commutator top, and this current is taken through a brush assembly 176 to the solenoid operated valves of the induction system of the motor.

The operation of the combined speed sensitive and timing switch is as follows:

When the vehicle operator switches to the speed sensitive timing switch for conserving fuel on level stretches of road, the governor arms 153, at a desired speed, will pull down the governor top section 155. At lower speeds, the brushes 162 and 163 are in contact with the insulated ring 156 and no current can flow through the circuit. At the desired higher speed, the conductor sleeve ring 157 allows current to flow from the brush assembly which is connected with the manual dash switch to the brush 163. From the brush assembly 163 a conducting wire allows the current to flow to the timing section of the mechanism entering brush assembly 175. Whenever the commutator section, which allows current to pass, is in contact with the brush assemblies 175 and 176, the solenoid operated valves in the intake manifold of the vehicle engine will close the passageway leading to the carburetor and open the other passageway, allowing air without fuel to enter the engine. If the insulating section of the commutator is in contact with the two brush assemblies, no current will flow through the circuit and the engine operates normally.

Figs. 3 and 4 show a modified form of electrically controlled induction system which is identical with the preferred form shown in Figs. 1 and 2 with the exception that the valve means for preventing communication between the carburetor 18' and the intake manifold 17' does not vent the interior of the manifold 17' to the atmosphere when closed. In Figs. 3 and 4 the primed numerals indicate the corresponding elements of Figs. 1 and 2 which are indicated by the same numbers unprimed. A gate valve 45 having a stem 27' and having a compression spring 29' normally holding said valve in open position is interposed in the conduit 19' between the carburetor 18' and the manifold 17'. Upon energization of the solenoid coil 30', the gate valve 45 is moved to the closed position shown in Fig. 4. This completely shuts off all communication between the carburetor 18' and the intake manifold 17', and no fuel is fed to the engine while the valve 45 is closed.

Fig. 5 shows an hydraulically operated modified form of the invention wherein a manifold 46 is provided with a poppet valve 47 which operates in a manner identical with the valve 26 of Figs. 1 and 2. The valve actuating mechanism, however, is different. The valve 47 is provided with a stem 48 having a piston 49 formed on its outer end. The tubular extension 50 has a closed outer end forming a cylinder in which the piston 49 is slidable. A spring 51 normally holds the piston 49 and the valve 47 in the position shown in Fig. 5.

The numeral 52 indicates a positive displacement gear pump which may be the oil pump of the vehicle engine. A fluid inlet conduit 53 connects the inlet of the pump 52 with a suitable source of fluid, such as the engine crank case, and a conduit 54 is connected to the outlet of the pump 52. A valve 55, which is preferably operable from the dashboard of the vehicle, is connected to the conduit 54 and to a pressure relief valve 56, as shown. The outlet of the valve 56 is connected through a conduit 57 to a port 58 in the casing 59 of a valve 60. A conduit 61 affords communication between a port 62 in the valve body 59 and the conduit 53, while a pressure relief valve 63 is connected between the conduit 57 and the conduit 61 as shown. The ports 58 and 62 are spaced and are aligned axially of the body 59. Diametrically opposite the ports 58 and 62 are ports 64 and 65 respectively. A conduit 66 affords communication between the ports 64 and 65 and the interior of the closed outer end of the tubular extension 50. Axially slidably positioned within the valve body 59 is a cylindrical valve member 67 which is formed with a transverse bore 68. The bore 68 affords communication between the ports 62 and 65 when the valve member 67 is in the position shown in Fig. 5, said valve member being movable to a raised position wherein the bore 68 affords alternative communication between the ports 58 and 64.

The numeral 69 indicates an accelerator for the engine, and the numeral 70 indicates a pivotally mounted lever which is connected to the stem 71 of the valve member 67. A spring 72 normally urges the lever 70 in a counterclockwise direction as viewed in Fig. 5, thereby urging the valve member 67 to the position shown. A throttle linkage 73 connects the accelerator 69 to the carburetor in the usual manner and includes a shoulder 74. When the accelerator 69 is depressed, the shoulder 74 is out of contact with the lever 70, but when the accelerator 69 is released, it rises in the usual manner, causing the shoulder 74 to rotate the lever 70 in a clockwise direction and to lift the valve member 67 to the position wherein the bore 68 communicates between the ports 58 and 64.

The pressure relief valve 56 is set to open when the fuel pump 52 generates a predetermined pressure, said pressure preferably being that which is generated at vehicle speeds above 15 miles per hour. The pressure relief valve 63 is set to open at a predetermined higher pressure.

In operation of the form of the invention shown in Fig. 5, the valve 56 remains closed until the vehicle exceeds the speed of 15 miles per hour. Whenever the accelerator 69 is released, the valve 67 is moved to raised position, and the fluid from the pump flows through the valves 55 and 56, conduit 57, port 58, bore 68, port 64 and conduit 66 into the chamber outwardly of the piston 49, to force said piston to the right and move the valve 47 to the position of the valve 26 of Fig. 2. The valve 47 remains in this position until either the vehicle speed decreases to below 15 miles per hour or until the accelerator 69 is depressed to cause the valve member 67 to be moved back to its position in Fig. 5. Whenever the speed of the vehicle goes below 15 miles per hour the oil pressure from the pump 52 is insufficient to hold the valve 56 open and therefore no fluid pressure is exerted on the piston 49. As a result, spring 51 moves the piston 49 and the valve 47 to the left to its normal position shown in Fig. 5. When the valve member 67 is in the position of Fig. 5, no fluid pressure is exerted on the piston 49, and any fluid in the chamber outwardly of the piston 49 flows back to the pump inlet conduit 53 through the conduit 66, port 65, bore 68, port 62 and conduit 61. The fluid is caused to flow in this direction by the piston 49 which, in turn, is urged outwardly by the compression spring 51.

It is apparent that the form of invention shown in Fig. 5 embodies the same type of manifold valving arrangement as the forms shown in Figs. 1 and 2. In each form the valve is moved to one or the other of two positions in accordance with the speed of the vehicle and the position of the accelerator. In addition, it is apparent that by turning the valve 55 to closed position, the improved features of the induction system shown in Fig. 5 are rendered inoperative, and the vehicle operates in the conventional manner.

In Fig. 6 a modified form of hydraulically actuated induction system is shown, this form differing from the form of Fig. 5 in the same manner that the form of Fig. 3 differs from the form of Fig. 1. A gate valve 47' replaces the poppet valve 47 of Fig. 5, the valve 47' being interposed between the carburetor 75 and the intake manifold 46' in the same manner that the valve 45 is positioned in the form of the invention shown in Fig. 3. In Fig. 6 the elements indicated by the primed numerals correspond to the same elements indicated in Fig. 5 by the same numerals unprimed.

Except for the construction of the gate valve 47' the structure of the form of the invention shown in Fig. 6 is substantially the same as that of Fig. 5. The spring 51' acting against the piston 49' normally holds the gate valve 47' in open position. Whenever the speed of the vehicle exceeds 15 miles per hour and causes the pump 52' to generate pressure sufficient to open the pressure relief valve 56', and whenever the accelerator 69' is released to raise the valve member 67' so that the bore 68' communicates with the ports 58' and 64', fluid under pressure flows through the conduit 57', valve 60' and conduit 66' into the chamber above the piston 49'. This fluid pressure moves the piston 49' downwardly against the compression of the spring 51' and closes the valve 47'. As in the form of the invention shown in Fig. 5, the pressure against the piston 49' is relieved at any time that the accelerator 69' is depressed or the speed of the vehicle goes below 15 miles per hour. At such times the valve 47' returns to open position and the engine operates in the normal manner.

A mechanical governor-vacuum operated induction system is shown in Figs. 7 and 8. Referring to Fig. 7, the numeral 76 indicates an accelerator and conventional linkage 77 for connection to the carburetor, the linkage 77 having a shoulder member 78 thereon. The valve 79 may be identical to valve 60 of Fig. 5 and is connected to a pivotally mounted lever 80 which is urged in a counter-clockwise direction by a tension spring 81. Valve 79 has a cylindrical valve member 82 and is formed with ports 83, 84, 85 and 86 respectively corresponding to the ports 58, 64, 62 and 65 of the valve 60 in Fig. 5.

The manifold valving arrangement shown in Fig. 7 is substantially identical as that shown in Figs. 1 and 5, except for the actuating mechanism. In Fig. 7 a poppet valve 87 is integral with an elongated stem 88 on which is formed a piston 89, the latter being positioned within the tubular extension 90. The tubular extension 90 is formed with apertures 91 and with an internal partition 92 outwardly of the apertures 91. A helical compression spring 93 surrounds the stem 88 between the piston 89 and the partition 92 and urges the piston 89 outwardly to seat the valve 87 over the inner end of the tubular extension 90 as shown. As in Figs. 1 and 5, the carburetor 94 is connected to the intake manifold 95 through a conduit 96, and the inner end of the conduit 96 is adapted to be sealed off by the poppet valve 87.

The outer end of the stem 88 is formed with an enlarged shoulder 89. A mechanical governor 90 is suitably connected to the engine and is driven thereby, said governor preferably having rotating weights or balls 91 and having a tension spring 92 tending to pull said weights together. The weights 91 are connected to an axially movable sleeve 93 by means of a suitable linkage such that when the speed of the engine and of the rotating balls 91 reaches a predetermined level, said balls diverge against the tension of the spring 92 and draw the sleeve 93 axially outwardly. A pivotally mounted lever 94 is connected at one end to the sleeve 93, and is connected at its other end to a yoke 95 having a lost motion connection with the shoulder 89 of the stem 88.

The connection between the yoke 95 and the shoulder 89 is such that when the speed of the vehicle is less than a predetermined speed, such as 15 miles per hour, the spring 92 holds balls 91 in their nearest together position, thereby holding the sleeve 93 in its lower or innermost position. When this condition obtains, the yoke 95 is in its uppermost position and engages the underside of the shoulder 89, preventing inward movement of the stem 88 and the valve 87 from the positions of Fig. 7. However, when the speed of the vehicle exceeds 15 miles per hour, the sleeve 93 is moved upwardly to thereby move the yoke 95 downwardly, thereby permitting downward movement of the stem 88 and of the valve 87.

The valve 97, which is preferably controlled from the dash board of the vehicle, is connected to the port 83 of the valve 79 through a conduit 98. The valve 97 is also connected to the interior of the intake manifold 95 through a conduit 99. The port 85 of the valve 79 is vented to the atmosphere, while a conduit 100 affords communication between ports 84 and 86 and the interior of the tubular member 90 between the piston 89 and the partition 92. It is apparent that when the accelerator 76 is depressed, as shown in Fig. 7, the interior of the tubular member 90 between the piston 89 and the partition 92 is vented to the atmosphere through the conduit 100, port 86, bore 101 and port 85. At such times, the spring 93 holds the valve 87 in the position shown in Fig. 7.

However, when the accelerator 76 is released, the valve member 82 is raised by the lever 80 to cause registration of the bore 101 with the ports 83 and 84. Vacuum from the manifold 95 then acts through the conduit 99, valve 97, conduit 98, bore 101, and conduit 100 to reduce the pressure in the chamber between the partition 92 and the piston 89 in the member 90. This reduction of pressure draws the piston 89 inwardly against the compression of the spring 93, and moves the valve 87 against the inner end of the conduit 96, to seal the same.

This valve movement takes place only when it is permitted by the governor 90, i. e., when the speed of the vehicle exceeds 15 miles per hour. At speeds below 15 miles per hour, the governor 90, acting through the yoke 95, aids the spring 93 in holding the valve 87 seated against the inner end of the tubular connection 90 as shown in Fig. 5, regardless of the pressure condition between the piston 89 and the partition 92 in the member 90. The structure is such that the vacuum from the manifold is never sufficient to move the piston when the governor resists such movement. Whenever the accelerator 76 is again depressed, the valve member 82 returns to the position of Fig. 7, to thereby vent the evacuated chamber to the atmosphere. As in Figs. 1 and 5, whenever the valve 87 is seated on the inner end of the tubular connection 96, air is drawn into the intake manifold through the apertures 91, and no fuel is drawn from the carburetor.

In Fig. 8, a modified form of mechanical governor-vacuum operated induction system is shown. The form of Fig. 8 differs from the form of Fig. 7 in substantially the same manner as the forms of Figs. 3 and 6 differ respectively from the forms of Figs. 1 and 5. The primed numerals in Fig. 8 indicate elements corresponding to the elements of Fig. 7 which are indicated by the same numerals unprimed.

In Fig. 8 a gate valve 103 is interposed in the conduit 96' between the carburetor 94' and the intake manifold 95'. The spring 93' normally holds the valve 103 in the open position shown, while the governor 90' prevents closing of the valve 103 at any time the vehicle travels below 15 miles per hour. The vacuum actuation of the piston 89' is identical with that of the vacuum actuation of the piston 89 of Fig. 7. Whenever the vehicle is traveling at a speed in excess of 15 miles per hour and the accelerator 76' is released, vacuum from the manifold 95', acting through the valve 79' and conduits 99', 98', and 100', causes a lowered pressure condition in the chamber below the piston 89', which condition causes the piston 89' and the valve 103 to move downwardly, thereby closing said valve. Upon depressing the accelerator 76', the chamber below the piston 89' is vented to the atmosphere through the valve 79' and conduit 100', and the spring 93' thereupon opens the valve 103.

A mechanical governor-fluid pressure actuated induction system is shown in Fig. 9. In this system the manifold valving arrangement is substantially identical with that shown in Fig. 5, except that the valve stem 103 is elongated and is provided with an enlarged shoulder 104 outwardly of the tubular extension 105. The latter has a closed outer end wall 106 through which the stem 103 extends, there being a transverse partition 107 spaced inwardly from the wall 106. A piston 108 is formed on the stem 103 between the partition 107 and the end wall 106, and a helical spring 109 is positioned around the stem 103 between the piston 108 and the port 107. The tubular member 105 is formed with apertures 110 between the partition 107 and the intake manifold 111, the inner end of the member 105 extending within the manifold as shown.

A carburetor 112 normally communicates with the interior of the manifold 111 through a conduit 113. A poppet valve 114 normally seals off the inner end of the tubular member 105 and is movable to an alternative position wherein it seals off the inner end of the conduit 113, in the same manner that the valve 26 seals off the conduit 19 in Fig. 2. A mechanical governor 115 may be identical with the governor 90 of Fig. 7 and is preferably connected, through a pivotally mounted lever 116, to yoke 117 which, in turn, coacts with the valve stem shoulder 104 as shown.

An accelerator 118 is connected through suitable linkage 119 to the carburetor 112, and said linkage is provided with a shoulder member 120 which is cooperable with a pivotally mounted lever 121. The lever 121 is connected at one end to a tension spring 122 which urges said lever in a counter-clockwise direction as viewed in Fig. 9. The other end of the lever 121 is connected to the valve member 123 of a valve 124. The valve 124 may be identical to the valves 79 and 60 of Figs. 7 and 5 respectively, and it is provided with ports 125, 126 127 and 128 corresponding to the ports 83, 84, 85 and 86 of the valve 79. The valve member 123 is formed with a transverse bore 129.

The number 130 indicates a positive displacement fluid pump having a conduit 131 adapted to connect the inlet of said pump to a suitable source of fluid. The outlet of the pump 130 is connected to the port 125 by a conduit 132 in which is interposed a valve 133, the latter being preferably controlled from the dash board of the vehicle. A pressure relief valve 134 is connected between the conduits 132 and 131. A conduit 135 connects the port 127 with the inlet conduit 131, and a conduit 136 affords communication between the ports 126 and 128 and the interior of the chamber outwardly of the piston 108 in the tubular extension 105.

As in the form of the invention shown in Fig. 7, the spring 122 and lever 121 move the valve member 123 to the position shown whenever the accelerator 118 is depressed. However, when the accelerator 118 is released, the shoulder 120 rotates the lever 121 clockwise and lifts the valve member 123 to bring the bore 129 into registration with the ports 125 and 126.

The pressure relief valve 134 is set so that the pressure acting through the valve 124 and the conduit 136 against the piston 108 is sufficient to move the piston 108 against the action of the spring 109, but is not sufficient to move said piston 108 against the action of the governor 115 when the speed of the vehicle is less than a predetermined speed, such as 15 miles per hour.

It is apparent that whenever the speed of the vehicle is in excess of 15 miles per hour and the accelerator 118 is released, fluid under pressure from the pump 103 moves the piston 108 and the valve 114 downwardly until the valve 114 seals off the inner end of the conduit 113. As in Figs. 1 and 5, this valve movement permits air to be drawn into the manifold 111 through the apertures 110, and at such times no fuel from the carburetor is used. When the speed of the vehicle goes below 15 miles per hour, or when the accelerator 118 is again depressed, the valve 114 is moved back to the position shown in Fig. 9, wherein fuel-air mixture is drawn into the manifold 111 from the carburetor 112.

In Fig. 10 is shown an improved type of fluid coupling 20 which is particularly well adapted for use in a vehicle provided with the improved induction system, but which has utility in other vehicles as well. The fluid coupling 20 has a casing 137 in which is mounted a rotary driving or pump element 138 which has a coaxial shaft 139 adapted to be connected to the crankshaft of a vehicle engine. A rotary driven or turbine element 140 is keyed to a coaxial driven shaft 141 which is also coaxial with the shaft 139.

The inner end of the shaft 139 is preferably enlarged, and the enlargement is preferably formed with a recess 142 in which the inner end of the driven shaft 141 is rotatably mounted. The enlarged portion of the shaft 139 is also formed with a recess 143, within which the shaft 141 is shaped, as at 144, to provide a one way clutch in cooperation with rollers 145.

The one way clutch thus provided permits slippage between the elements 138 and 140 when the element 138 tends to drive the element 140. However, when the driven element 140 tends to drive the element 138, the one way clutch forms a direct connection between the shafts 141 and 139. It is apparent that the improved fluid coupling 20 has the advantages of a conventional clutch type transmission, while at the same time having the advantages of smooth acceleration inherent in a fluid coupling. The improved fluid coupling provides direct driving connection between wheels and the engine whenever the vehicle is traveling with the throttle substantially closed, such as when slowing up for stop signs or when going down grade with the accelerator released. The improved fluid coupling also permits the vehicle equipped therewith to be readily started by means of pushing, it having the advantages of a conventional gear and clutch type transmission in this respect.

The improved induction system provides substantial economies in fuel consumption without any inconvenience on the part of the driver and without requiring any change in driving habits. The system is automatic in operation and can be rendered inoperative at will by merely turning a dash board switch or valve, thereby permitting conventional engine operation. The improved system not only gives increased engine efficiency, but it also prevents pumping of oil into the cylinders and the fouling of the spark plugs.

While the drawings show several forms of the invention, these are merely illustrative. It is obvious that various changes and modifications, such as changes in specific valve structure, for example, may be made without departing from the spirit of the invention. All of such changes are contemplated as may come within the scope of the claims.

What I claim as the invention is:

1. In an internal combustion engine: a carburetor having a predetermined volumetric capacity and having an inlet passageway formed with a valve seat; an intake manifold with which said inlet passageway normally communicates, said manifold being provided with an atmospheric vent having a volumetric capacity substantially as great as that of said carburetor; a valve seal for said vent; a valve stem carrying a valve head reciprocatably mounted relative to said carburetor inlet passageway and to said vent in a manner to normally close said vent, said valve stem being movable to an alternative position wherein the head closes said inlet passageway and opens said vent; a normally released accelerator connected to said carburetor; and valve actuating mechanism connected to said accelerator and to said valve means and automatically responsive to a predetermined speed of the engine when the accelerator is in normal released position for moving said valve means to said alternative position.

2. In an internal combustion engine: a carburetor having a predetermined volumetric capacity and having an inlet passageway; an intake manifold with which said inlet passageway communicates; an annular valve seat in said manifold surrounding the inner end of said inlet passageway, said manifold being formed with an atmospheric vent opening spaced from and opposite the first-mentioned valve seat, said vent opening having a volumetric capacity substantially as great as the volumetric capacity of said carburetor; an annular valve seat in said manifold surrounding said vent opening alined with the inlet passageway valve seat; a single headed poppet valve movably mounted in said manifold and normally seated on the vent opening valve seat to close off said vent, said valve being reciprocatable and alternatively positionable in sealing engagement with said inlet passageway valve seat to close off said inlet passageway; spring means urging said valve against said vent opening valve seat; a normally released accelerator connected to said carburetor; and valve actuating mechanism connected to said accelerator and to said valve and responsive to a predetermined speed of the engine when the accelerator is in normal released position for automatically moving said valve to said alternative position.

3. In an internal combustion engine and induction system therefor according to claim 1 wherein there is fluid pressure actuated operating mechanism for the valve stem and a valve for controlling the fluid actuation of said operating mechanism, with a speed responsive mechanism connected to said operating mechanism and to said engine in a manner to prevent movement of the valve stem to said alternative position except at engine speeds above a predetermined minimum and characterized in that the valve actuating mechanism connected to the accelerator is connected in such a manner that the control valve permits fluid actuation of said operating mechanism and movement of the valve stem to said alternative position when the accelerator is in normal released position, and such that said control valve prevents fluid actuation of the operating mechanism when the accelerator is in an adjusted position.

4. In an internal combustion engine: a carburetor having a predetermined volumetric capacty and having an inlet passageway formed with a valve seat; an intake manifold with which said inlet passageway normally communicates, said manifold being provided with an atmospheric vent having a volumetric capacity substantially as great as that of said carburetor; a valve seat for said vent; a valve stem carrying a valve head reciprocatably mounted relative to said carburetor inlet passageway and to said vent in a manner to normally close said vent, said valve stem being movable to an alternative position wherein the head closes said inlet passageway and opens said vent; fluid pressure actuated operating mechanism for said valve stem; a fluid pump driven by said engine; a pressure relief valve connected to the outlet of said pump, said pressure relief valve being operable to open in response to a predetermined pressure in the pump outlet, said pressure being generated at a predetermined engine speed; a control valve connected to the outlet of said pressure relief valve and to the operating mechanism of said valve stem; an accelerator normally in released position and movable to an adjusted position; and means connecting said accelerator to said control valve in a manner to permit flow of fluid through the latter from said relief valve to the operating mechanism for said valve stem when the accelerator is in normal released position and to prevent such fluid flow when the accelerator is in said adjusted position.

5. In an internal combustion engine: a carburetor having a predetermined volumetric capacity and having an inlet passageway formed with a valve seat; an intake manifold with which said inlet passageway normally communicates, said manifold being provided with an atmospheric vent having a volumetric capacity substantially as great as that of said carburetor; a valve seat for said vent; a valve stem carrying a valve head reciprocatably mounted relative to said carburetor inlet passageway and to said vent in a manner to normally close said vent, said valve stem being movable to an alternative position where it closes said inlet passageway and opens said vent; vacuum actuated operating mechanism for said valve stem; a speed responsive mechanism connected to said valve stem and to said engine in a manner to prevent movement of said valve stem to said alternative position except at engine speeds above a predetermined minimum; a control valve connected to said manifold and to the operating mechanism of said valve stem; an accelerator normally in released position and movable to an adjusted position; and means connecting said accelerator to said control valve in a manner such that the control valve affords communication between the manifold and the operating mechanism of said valve means when the accelerator is in normal released position and such that said control valve prevents said communication when the accelerator is in said adjusted position.

6. In an internal combustion engine: a carburetor having a predetermined volumetric capacity and having an inlet passageway formed with a seat; an intake manifold with which said inlet passageway normally communicates, said manifold being provided with an atmospheric vent having a volumetric capacity substantially as great as that of said carburetor; a valve seat for said vent; a valve stem carrying a valve head reciprocatably mounted relative to said carburetor inlet passageway and to said vent in a manner to normally close said vent, said valve stem being movable to an alternative position where it closes said inlet passageway and opens said vent; fluid pressure actuated operating mechanism for said valve stem; a source of fluid under pressure; speed responsive mechanism connected to said valve stem and to said engine in a manner to prevent movement of said valve stem to said alternative position except at engine speeds above a predetermined minimum; a control valve connected to the source of fluid under pressure and to the operating mechanism of said valve stem, an accelerator normally in released position and movable to an adjusted position; and means connecting said accelerator to said control valve in a manner to permit flow of pressure fluid through the latter from said source to the operating mechanism of said valve means when the accelerator is in normal released position and to prevent such fluid flow when the accelerator is in said adjusted position.

7. In an internal combustion engine: a carburetor having a predetermined volumetric capacity and having an inlet passageway formed with a valve seat; an intake manifold with which said inlet passageway normally communicates, said manifold being provided with an atmospheric vent having a volumetric capacity substantially as great as that of said carburetor; a valve seat for said vent alined with the first-mentioned valve seat, reciprocatable valve means connected to said carburetor inlet passageway and to said vent in a manner to normally close said vent, said valve means being reciprocatable to an alternative position where it closes said inlet passageway and opens said vent; actuating mechanism connected to said valve means; and speed sensitive timing mechanism connected to said actuating mechanism in a manner to cause the latter to automatically move said valve means from one of said positions to the other at predetermined timed intervals.

8. In an internal combustion engine: a carburetor having a predetermined volumetric capacity and having an inlet passageway; an intake manifold with which said inlet passageway normally communicates, said manifold being provided with an atmospheric vent having a volumetric capacity substantially as that of said carburetor; reciprocatable valve means connected to said carburetor inlet passageway and to said vent in a manner to normally close said vent, said valve means being movable to an alternative position where it closes said inlet passageway and opens said vent; a normally released accelerator connected to said carburetor; valve actuating mechanism connected to said accelerator and to said valve means and responsive to a predetermined speed of the engine when the accelerator is in normal released position for automatically moving said valve means to said alternative position; and manually operable means for selectively rendering said valve actuating mechanism inoperative.

9. In an internal combustion engine: a carburetor having a predetermined volumetric capacity and having an inlet passageway; an intake manifold with which said inlet passageway normally communicates, said manifold being provided with an atmospheric vent having a volumetric capacity substantially as great as that of said carburetor; reciprocatable valve means connected to said carburetor inlet passageway and to said vent in a manner to normally close said vent, said valve means being movable to an alternative position where it closes said inlet passageway and opens said vent; a source of electric current; electromagnetic actuating mechanism for said valve means; a normally open switch having actuating mechanism responsive to a predetermined speed of the engine for moving said switch to closed position; an accelerator normally in released position; a normally closed accelerator operated switch; an electrical circuit connected to said source of current to said speed responsive and said accelerator switches, and to said electro-magnetic actuating mechanism, whereby the latter is energized and the valve means is automatically moved to said alternative position in response to a predetermined speed of the engine when said accelerator is in normal released position; and a manually operated shut-off switch in said electrical circuit for selectively preventing energization of said electro-magnetic valve actuating mechanism.

10. In an internal combustion engine and induction system therefor according to claim 1 wherein there is fluid pressure actuated operating mechanism for the valve stem and a valve for controlling the fluid actuation of said operating mechanism, with a speed responsive mechanism connected to said operating mechanism and to said engine in a manner to prevent movement of the valve stem to said alternative position except at engine speeds above a predetermined minimum and characterized in that the valve actuating mechanism connected to the accelerator is connected in such a manner that the control valve permits fluid actuation of said operating mechanism and movement of the valve stem to said alternative position when the accelerator is in normal released position, and such that said control valve prevents fluid actuation of the operating mechanism when the accelerator is in an adjusted position; together with a manually operable shut-off valve connected to said fluid pressure actuated valve stem operating mechanism for selectively preventing fluid pressure actuation of said mechanism.

11. In an internal combustion engine and induction system therefor according to claim 10 wherein there is a fluid pump driven by the engine; a pressure relief valve connected to the outlet of said pump and operable to open in response to a predetermined pressure in the pump outlet; characterized in that the manually operable shut-off valve is connected to the outlet of said pump in a manner to selectively prevent the flow of fluid from the latter to the operating mechanism for the valve stem.

12. In an internal combustion engine and induction system therefor according to claim 5 characterized in that there is a manually operable shut-off valve connected to the control valve for selectively preventing communication between the manifold and the operating mechanism for said valve stem.

13. An internal combustion engine and induction system therefor according to claim 1 characterized in that the valve actuating mechanism connected to the accelerator and to the valve means is electrically controlled.

14. An internal combustion engine and induction system therefor according to claim 1 characterized in that the valve actuating mechanism connected to said accelerator and to said valve means is hydraulically operated.

15. An internal combustion engine and induction system therefor according to claim 1 characterized in that the valve actuating mechanism connected to the accelerator and to the valve means is vacuum operated.

References Cited in the file of this patent

UNITED STATES PATENTS

| Number | Name | Date |
|---|---|---|
| 1,215,381 | Kemp | Feb. 13, 1917 |
| 1,803,145 | Reineke | Apr. 28, 1931 |
| 1,804,521 | Swingle | May 12, 1931 |
| 1,956,657 | Scheel | May 1, 1934 |
| 1,970,002 | Ericsson | Aug. 14, 1934 |
| 2,075,790 | Christensen | Apr. 6, 1937 |
| 2,174,972 | Dach | Oct. 3, 1939 |
| 2,227,107 | Rivers | Dec. 31, 1940 |
| 2,390,603 | Mallory | Dec. 11, 1945 |
| 2,393,579 | Weiss et al. | Jan. 22, 1946 |
| 2,395,748 | Mallory | Feb. 26, 1946 |
| 2,439,573 | Mallory | Apr. 13, 1948 |
| 2,443,562 | Hieger et al. | June 15, 1948 |

FOREIGN PATENTS

| Number | Country | Date |
|---|---|---|
| 261,022 | Great Britain | Oct. 13, 1927 |